United States Patent
Perry

[15] 3,684,939
[45] Aug. 15, 1972

[54] AUTOMATIC POSITIONING ACCESSORY FOR NUMERICAL CONTROL MACHINE TOOLS

[72] Inventor: Dean A. Perry, Torrance, Calif.
[73] Assignee: Allied Industrial Components, Lynwood, Calif.
[22] Filed: Feb. 4, 1971
[21] Appl. No.: 112,612

[52] U.S. Cl. .................... 318/468, 33/185, 90/11
[51] Int. Cl. .................................... G05g 5/00
[58] Field of Search .......... 318/468, 467, 469, 626; 33/185; 90/11

[56] References Cited

UNITED STATES PATENTS

| | | | |
|---|---|---|---|
| 3,481,247 | 12/1969 | Hayes | 90/11 |
| 3,350,617 | 10/1967 | Firth | 318/468 |
| 2,828,458 | 3/1958 | Quallen et al | 318/626 X |
| 3,010,058 | 11/1961 | Clarke | 318/468 X |

Primary Examiner—Benjamin Dobeck
Attorney—Harris, Kiech, Russell & Kern

[57] ABSTRACT

An accessory for use on a numerical control (N/C) machine tool to establish the Z-axis zero setting of the spindle of the machine, including: motor driven means for rotating the manual Z-axis actuator of the machine; a manually operable switch for energizing the motor driven means; a gauge block on the Z axis and engageable by a cutting tool carried by the spindle; and a switch actuable by the gauge block, when engaged by the cutting tool, to de-energize the motor driven means. Thus, the spindle is stopped at the desired Z-axis zero setting for the particular cutting tool.

3 Claims, 3 Drawing Figures

PATENTED AUG 15 1972 3,684,939

INVENTOR
DEAN A. PERRY
BY HIS ATTORNEYS
HARRIS, KIECH, RUSSELL & KERN

AUTOMATIC POSITIONING ACCESSORY FOR NUMERICAL CONTROL MACHINE TOOLS

BACKGROUND OF INVENTION

The present invention relates in general to establishing reference or "zero" settings along the various axes of machine tools. More particularly, the invention relates to establishing reference or zero settings for cutting tools used with the machine on their respective axes of movement. For convenience, the invention will be considered herein in connection with establishing a zero setting for a spindle-driven cutting tool on what is conventionally referred to as the Z axis of the machine. However, it will be understood that the invention may be utilized to establish zero settings on other machine tool axes.

Considering the invention still more particularly, it relates specifically to establishing a Z-axis zero setting, or other axis zero setting, in a so-called numerical control (N/C) machine tool. Such a machine tool may be controlled by a punched tape, a digital magnetic tape, direct numerical control, computer controlled N/C, or the like, and normally includes a machine control unit, which may be at a remote location, and operator pendant or console, usually adjacent the spindle, or other movable machine-tool component, to be controlled. The operator pendant or console is equipped with a manually operated servo or selsyn independently controlling the spindle movement along the Z axis, along with other servos controlling other machine axes. The hand servo or selsyn is controlled by a manually-operable rotatable knob, or other rotary actuator, on the operator pendant or console. In a typical N/C machine tool, rotation of this actuator through one full turn will cause the servomechanism and drive unit for the spindle carrier to move the spindle 0.050 inch in one direction or the other, depending upon the direction in which the rotary actuator is turned. In some instances, this rotary actuator may be located on the machine control unit itself, in addition to, or instead of on, a separate operator pendant or console.

Merely as an example, it is necessary to reestablish a given Z-axis zero setting with a N/C machine tool of the foregoing nature each time the cutting tool is changed, because of variations from one tool to another. One conventional way of accomplishing this is to position a gauge block on the Z axis in the path of the cutting tool carried by the spindle and then, utilizing the Z-axis rotary actuator on the operator pendant or console, or on the machine control unit itself, bring the cutting tool into contact with the gauge block.

This establishes a zero setting corresponding to the particular gauge block used. It will be understood that this does not affect the tape input section of the machine tool, but merely serves to offset or shift the point of origin to the precise location desired, prior to operating the machine tool automatically through the use of the machine control unit.

Establishing a Z-axis, or other axis, zero setting in the foregoing manner is subject to various disadvantages. First of all, the zero setting is dependent upon the "feel" of the operator. Since the sensitivity of feel varies considerably from one operator to another, variations in the accuracy of the zero settings occur, and these affect the accuracy of the subsequent machine operations, which is obviously undesirable. Also, the procedure outlined is very time consuming and thus quite expensive since skilled operators are required. Another disadvantage is that considerable cutter damage occurs due to impacting of the gauge block by the cutter if the operator brings the cutter into engagement with the gauge block at too high a speed. Such damage is encountered with carbide and carbide-tipped cutting tools in particular.

SUMMARY AND OBJECTS OF INVENTION

With the background hereinbefore set forth in mind, a general object of the present invention is to provide a means of establishing zero settings in N/C machine tools which eliminates the foregoing and various other disadvantages of conventional procedures.

More particularly, a primary object of the invention is to provide a means for establishing zero settings, and particularly a Z-axis zero setting, which comprises simply an accessory capable of attachment to any of a wide variety of existing N/C machines with only very minor modifications, and with no modifications whatsoever in movable component drives, such as recirculating ball screws, servomechanism, or drive unit for the axis slides.

Another and important object of the invention is to provide an accessory for attachment to an existing machine which establishes the desired reference or zero setting completely automatically with no attention on the part of the operator other than to turn the accessory "on".

Summarizing the invention, it comprises an automatic positioning accessory for a movable component of a machine tool having a drive for the movable component and a rotary actuator which controls the drive and which is normally manually operated, which automatic positioning accessory includes: motor driven means for rotating the rotary actuator to cause the movable-component drive to move such component along its axis; manually operable switch means for energizing the motor driven means; gauge means on the axis of movement of the movable component; and self-contained switch means incorporated in the gauge means for de-energizing the motor driven means upon arrival of the movable component at the desired zero position on the axis.

As will be apparent, with the foregoing automatic positioning accessory, the operator merely retracts the movable component, places in position a gauge means corresponding to the desired zero setting, and then turns the accessory "on", whereupon the accessory automatically establishes the desired zero setting, which is an important feature of the invention.

Another object is to provide a self-contained switch means which allows for the normal overrun of the motor driven means for the rotary actuator and the drive for the spindle, or other movable component of the machine tool. By automatically compensating for overrun in this manner, the zero setting can be established with excellent accuracy, e.g., within ±0.0005 inch.

Another object of the invention is to utilize a gauge means which includes a movable gauge block engageable by the movable component of the machine, e.g., a cutting tool, and wherein the switch means includes a switch engaging the gauge block and actuable by the gauge block upon engagement of the cutting tool therewith. A related object is to provide a switch which is yieldable to minimize the possibility of damage to the cutter upon engagement with the gauge block.

Yet another object of importance is to utilize a gauge block having a coating of cushioning material on the surface thereof which is engaged by the cutting tool, such cushioning material being Teflon, or the like. This further minimizes the possibility of damage to the cutter upon engagement with the gauge block.

Another object is to provide a plunger-type gauge block which can be replaced readily by a similar gauge block having different dimensions whenever a different zero depth setting, or other zero setting, is desired.

It might be well to point out that utilizing a self-contained switch means to de-energize the rotary-actuator drive means results in consistent accuracy in establishing zero settings, as opposed to utilizing a cutter and the gauge block as electrical contacts. Further, utilizing a self-contained switch means permits providing the gauge blocks with damage-preventing coatings, such as Teflon, which are electrically nonconductive.

A further object is to provide an adjustment for calibrating the precise point of actuation in a repeatable and pre-determined manner to maintain consistent establishment of axis position. This allows for slight variances in the cut-off point of actuation for switches used in the gauge blocks. The calibration is similar to finite adjustment of hand precision instruments to provide accuracy against metrology standards and eliminate tolerance variances in manufacture of the individual devices.

The foregoing objects, advantages, features and results of the present invention, together with various other objects, features, results and advantages thereof which will be apparent to those skilled in the art in the light of this disclosure, may be achieved with the exemplary embodiment of the invention illustrated in the accompanying drawing and described in detail hereinafter.

DETAILED DESCRIPTION OF EXEMPLARY EMBODIMENT OF INVENTION

Figure 1:
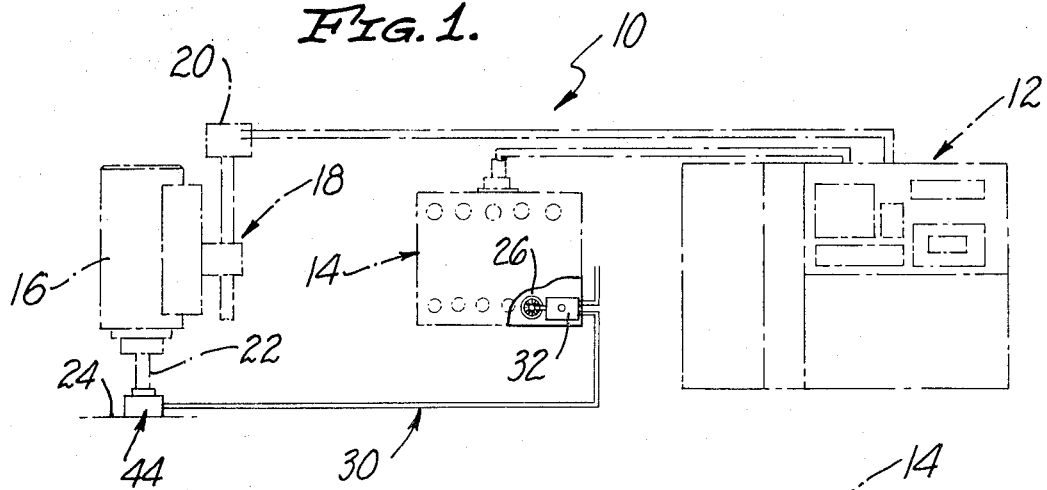
FIG. 1 is a semidiagrammatic view showing an automatic positioning accessory of the invention as installed on a conventional N/C machine tool, the latter being shown in broken lines.
Figure 2:
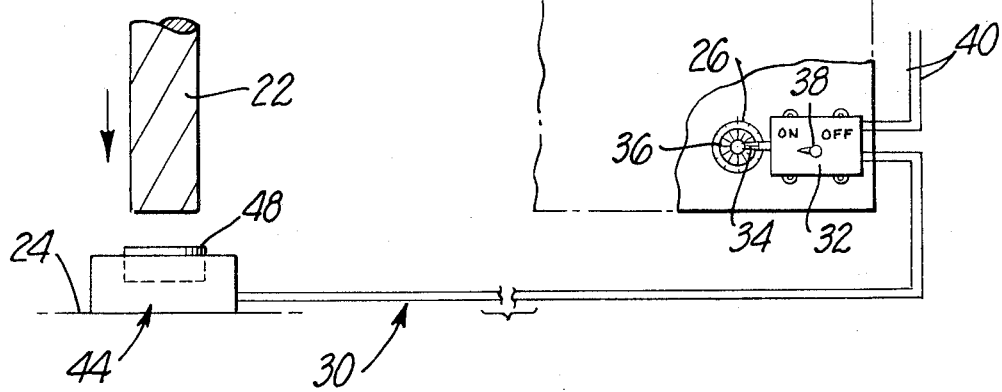
FIG. 2 is a fragmentary semidiagrammatic view showing portions of FIG. 1 on a larger scale.
Figure 3:
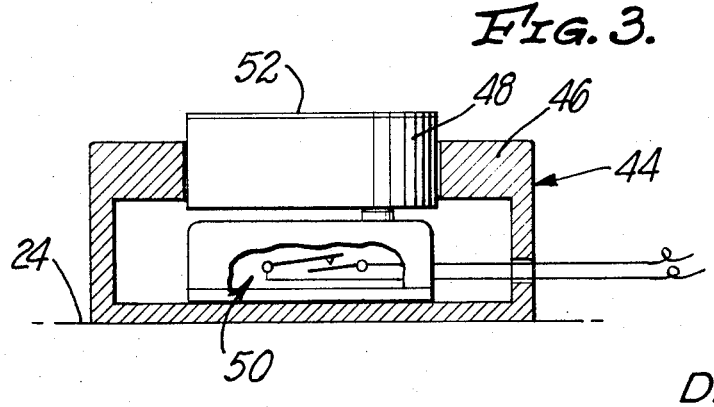
FIG. 3 is a semidiagrammatic sectional view through a gauge means forming part of the automatic positioning accessory of the invention.

Referring initially to FIG. 1 of the drawing, designated generally therein by the numeral 10 is an exemplary N/C machine tool comprising a machine control unit 12, an operator pendant 14 remote from the machine control unit, and a spindle 16 movable along a Z axis by a ball screw and nut 18 driven by a servomechanism and drive unit 20. The spindle 16 carries and drives a suitable cutting tool 22, which may be a milling cutter, for example, for performing a desired operation on a work piece, not shown, on a supporting table 24. The operator pendant 14 includes a manually operable, graduated, rotary actuator 26 which controls the spindle drive through a suitable servo or selsyn system so that the spindle 16 can be retracted or advanced along the Z axis manually in changing cutters, establishing zero settings, and the like. During actual machining, of course, the advance of the spindle 16 is controlled by the machine control unit 12 in accordance with a predetermined program, as represented by a punched tape, a digital magnetic tape, direct numerical control, computer controlled N/C, or the like.

The present invention resides in an accessory attachment 30 which automatically establishes the Z-axis zero setting of the cutter 22 in a manner to be described hereinafter. The automatic positioning accessory 30 of the invention can be used with a wide variety of existing N/C machine tools and machine control units with only very minor modifications thereof. A partial list follows:

| Machine manufacturer | Machine description | Control manufacturer | Control model | Control type |
|---|---|---|---|---|
| Cincinnati Milling Machine Company | Travelling Column Profiler 4' × 14' | Thompson–Ramo–Woolridge | TRW3000 | Punched Tape |
| Giddings and Lewis | Profiler, Di-Mill 6' × 10' | Bendix | Dynapath 23 | Punched Tape |
| Pratt and Whitney | Profiler 28"× 74" | Bendix | 1503 | Punched Tape |
| Giddings and Lewis | Profiler 5 Axis 4' × 14' | Bunker–Ramo Corp. | BRC3000 | Punched Tape |
| Cincinnati Milling Machine Company | Spar Mill 4 Axis 3' × 210' | General Electric | Mark Century | Digital Magnetic Tape |
| Froriep Corporation West Germany | VTBM 5 Axis 43' diameter | General Electric | Mark Century | Digital Magnetic Tape |
| Giddings and Lewis | Profiler 4 Axis 8' × 20' | General Electric | Mark Century | Digital Magnetic Tape |
| Giddings and Lewis | Profiler 3 Axis 8' × 20' | General Electric | Mark Century | Digital Magnetic Tape |
| Giddings and Lewis | Profiler 5 Axis 8' × 55' | General Electric | Mark Century | Digital Magnetic Tape |
| Cincinnati Milling Machine Company | Skin Mill 3 Axis 12' × 375' | General Electric | Mark Century | Digital Magnetic Tape |
| Cincinnati Milling Machine Company | Skin Mill 6' × 30' 3 Axis (Retrofit) | General Electric | 100 | Punched Tape |

The automatic positioning accessory 30 of the invention includes a drive and control unit 32 suitably mounted on the operator pendant 14, or on the machine control unit 12, adjacent the rotary Z-axis control knob or actuator 26 with which it is equipped. The unit 32 includes an electric motor, not shown, driving a bevel or worm pinion 34 meshed with a bevel ring gear 36 suitably secured to the rotary actuator 26, or its shaft. Thus, the unit 32 constitutes a motor driven means for rotating the rotary actuator 26, and is controlled by a manually operable switch or switch means 38 thereon. Mounting the unit 32 on the operator pendant 14 or machine control unit 12 and gearing it to the rotary actuator 26 constitute the only structural modifications of the machine 10 required by the present invention, which is an important feature since the invention is thus easily adapted to any machine of the type hereinbefore discussed.

Leads 40 connect the unit 32 to a suitable power source, not shown. Preferably, this power source is low voltage d.c. to minimize any shock hazard to the operator.

The automatic positioning accessory 30 of the invention also includes a gauge means 44 which can simply be placed on the table 24 under the Z axis slide so that it is engageable by the cutter 22 upon downward movement of the spindle 16. The gauge means 44 includes a suitable housing 46 in which a plunger-type gauge block 48 is vertically movable, the height of the gauge block and its calibrated point of switch actuation corresponding to the desired zero depth setting of the cutter 22. The gauge means 44 incorporates within its housing 46 a self-contained switch means 50 in series with the manual switch 38 for de-energizing the drive unit 32 upon engagement of the cutter 22 with the gauge block 48 and subsequent movement to the calibrated cut-off point of the switch means, thus maintaining a predetermined height from the table 24. The response of the switch means 50 is so selected as to automatically compensate for the normal overrun of the drive unit 32 and the axis servomechanism and drive unit, whereby the cutter 22 is stopped at precisely the desired zero setting, with an accuracy of ±0.0005 inch, for example. Preferably, the switch means 50 is yieldable to accommodate such overrun without damage to the cutter 22. Additionally, the gauge block 48 is provided with a cushioning coating 52 of Teflon, or a similar material to further minimize the possibility of damage to the cutter.

The switch means 50 may be of any suitable type, being shown semidiagramatically as a simple microswitch for purposes of illustration. However, the desired switching signal may be provided by any suitable means, such as a pressure switch, a linear variable displacement transducer, a reed switch, a proximity switch, or the like.

Considering now the way in which the automatic positioning accessory 30 of the invention is used, it will be assumed that a cutter change is required for some reason. Initially, the operator, utilizing the rotary actuator 26, retracts the spindle 16 to a level sufficient to permit the cutter change. The desired new cutter 22 is then installed in the spindle 16, and a gauge block 48 corresponding to the zero setting required for the next cutting operation is placed in the housing 46, with the housing on the table 24. The manual switch 38 is then turned to its "on" position, which results in energization of the drive unit 32 to move the spindle 16 along the Z axis toward the gauge means 44. When the cutter 22 contacts the gauge block 48 and upon subsequent movement to a calibrated cut-off point, the drive unit 32 is de-energized by the switch means 50, whereupon the cutter 22 stops, after the normal overrun allowed for, to establish the exact zero setting desired. The unit 32 is then turned "off" and the rotary actuator 26 is locked with the locking means, not shown, with which it is normally provided. Thereafter, normal N/C machine operation is initiated following the program required by the particular tape with which the machine control unit 12 is equipped.

As will be apparent from the foregoing, the present invention provides a very simple way of automatically establishing a zero setting for a movable machine-tool component along a particular axis without more than very minor modifications of the machine, which is an important feature of the invention.

Although an exemplary embodiment of the invention has been disclosed for purposes of illustration, it will be understood that various changes, modifications and substitutions may be incorporated in such embodiment without departing from the spirit of the invention as defined by the claims presented in the next section of this specification.

I claim as my invention:

1. in an automatic positioning accessory for a movable component of a machine having a drive for said movable component and a rotary actuator which controls said drive and which is normally manually operated, the combination of:
   a. motor drive means for rotating said rotary actoator;
   b. manually operable switch means for energizing said motor driven means;
   c. gauge means on the axis of movement of said movable component;
   d. switch means incorporated in said gauge means for de-energizing said motor driven means upon arrival of said movable component at a predetermined position on said axis;
   e. said gauge means being carried by a stationary component of said machine and being engageable by said movable component of said machine to actuate said switch means;
   f. said gauge means including a movable gauge block engageable by said movable component of said machine; and
   g. said switch means including a switch engaging said gauge block and actuable by said gauge block upon engagement of said movable component of said machine therewith.

2. An automatic positioning accessory as set forth in claim 1 wherein said gauge block is coated with a cushioning material to protect said movable component of said machine upon engagement thereof with said gauge block, said cushioning material being electrically nonconductive 3. An automatic positioning accessory as set forth in claim 2 wherein said gauge block and said switch means are provided with a means of calibration to a pre-determined height.

* * * * *